United States Patent [19]

Pires

[11] 4,022,972
[45] May 10, 1977

[54] TRANSIENT SUPPRESSION AND GREY LEVEL COINCIDENCE IN A SUBSCRIPTION TELEVISION SYSTEM

[75] Inventor: H. George Pires, Parlin, N.J.

[73] Assignee: Teleglobe Pay TV System Inc., Rego Park, N.Y.

[22] Filed: May 13, 1975

[21] Appl. No.: 577,047

[52] U.S. Cl. .......................... 358/124; 178/DIG. 13
[51] Int. Cl.² .......................................... H04N 1/44
[58] Field of Search ...................... 178/5.1, DIG. 13

[56] References Cited
UNITED STATES PATENTS

| | | | |
|---|---|---|---|
| 3,439,113 | 4/1969 | Walker | 178/5.1 |
| 3,440,338 | 4/1969 | Walker | 178/5.1 |
| 3,460,161 | 8/1969 | Waller et al. | 178/5.1 |
| 3,478,166 | 11/1969 | Reiter et al. | 178/5.1 |
| 3,801,732 | 4/1974 | Reeves | 178/5.1 |
| 3,824,332 | 7/1974 | Horowitz | 178/5.1 |
| 3,919,462 | 11/1975 | Hartung et al. | 178/5.1 |

*Primary Examiner*—Malcolm F. Hubler
*Assistant Examiner*—S. C. Buczinski
*Attorney, Agent, or Firm*—Marianne Rich

[57] ABSTRACT

Due to unavoidable timing and slope errors in the leading and trailing edges of invert pulses utilized in encoding and decoding of the television signal by inversion of the picture signal portion relative to the synchronizing signal portion, transients are generated. A clamping circuit clamps the television signal to a predetermined reference level for short time intervals around each desired switching time instant. The time intervals are sufficiently long to include the maximum possible variation in the actual timing of the switching time instants. A grey level is thus inserted at the encoder. At the decoder, a clamping circuit clamps the television signal to ground potential during the grey level intervals thereby balancing the DC components of the signal portions.

16 Claims, 7 Drawing Figures

TRANSIENT SUPPRESSION AND GREY LEVEL COINCIDENCE IN A SUBSCRIPTION TELEVISION SYSTEM

BACKGROUND OF THE INVENTION

In subscription television systems such as, for example, the system disclosed in U.S. Pat. No. 3,824,332 (Horowitz), the picture information is inverted in a random manner on a field basis while maintaining the synchronizing signals continuously at the same polarity. The present invention is, of course, not limited to such systems, but may be applied wherever a reversal of polarity of the television signal occurs. It will, however, be described as employed in the system disclosed in the above mentioned patent.

In such a subscription television system, the picture information is, of course, reconstituted at the decoders by reversing the inversion which has taken place at the encorder. In systems of this type, the following difficulties have been encountered.

1. The electronic reversing switch producing the inversion introduces spikes or transients in the signal. Such transients provide decoding information to would be pirates.

2. The reconstitution process in the decoder as mentioned above requires a switching operation to be performed between two video signals of opposite phase. The introduction of transients in the switching operation can adversely affect the operation of the home television receivers.

3. Mismatches in the DC components of the two signals, namely the reversed and the synchronizing signals, result in annoying flicker on the home television screen.

The above mentioned difficulties will be described in greater detail with reference to FIG. 1.

Consider one horizontal line of a conventional video signal as shown in FIG. 1(a) and the same signal with the picture information inverted as in FIG. 1(c). For convenience, these are shown as monochrome signals. The inverting pulse which produces the inversion required for scrambling is shown in FIG. 1(b) and the signal with inverted picture information in FIG. 1(c). If the pulse in FIG. 1(b) does not start and stop exactly coincident with blanking, the resulting signals are shown at FIG. 1(d) and FIG. 1(e). In one case, part of blanking and in the other, part of information is present in the wrong place. Information is therefore available to bypass the entire coding system. Also, because of the abrupt transition required by the inversion in FIG. 1(c), it is difficult to avoid an overshoot in the switching circuitry.

To reconstitute the signal in its proper format, a switching operation is again carried out between the sync portion and the video portion of FIG. 1(c). If the instant of switching is exactly coincident with that of the original coded signal (and at exactly the same rate of change), the signal in FIG. 1(a) will be recovered. However, if the switching occurs either too early (A) or too late (B), huge spikes will result, as shown in FIGS. 1(g) and 1(h). It is, of course, impossible to achieve perfect timing and consequently spikes in the decoded signal are inherent in the system.

The reconstituted signal at the decoder, that is the signal whose picture signal is again noninverted relative to the synchronizing signal, should have exactly the same DC level as the original, otherwise an annoying flicker results. Without the system of the present invention, it is very difficult to maintain this DC level over extended periods of time.

SUMMARY OF THE INVENTION

It is an object of the present invention to suppress the transients generated during the switching operations described above and to maintain a fixed relationship between the DC signal levels at the transmitting and the receiving ends.

The present invention resides in a subscription television apparatus and method. The subscription television apparatus comprises means for inverting the television signal to be encoded at first selected time instants and reinverting said television signal at second time instants each following a corresponding one of said first time instants. It further comprises clamping means for clamping the television signal to a predetermined reference level for determined time intervals each including one of said first selected or second time instants. The determined time intervals are sufficiently broad with respect to time to encompass the possible variations in the timing of the first and second time instants.

In a preferred embodiment of the present invention the first and second time instants respectively correspond to the beginning and the end of the picture information interval: that is, the picture information is inverted relative to the synchronizing signals. The combined blanking and grey level interval is slightly wider than the conventional blanking interval so that all the active picture information is definitely inverted if such inversion is to take place at all.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
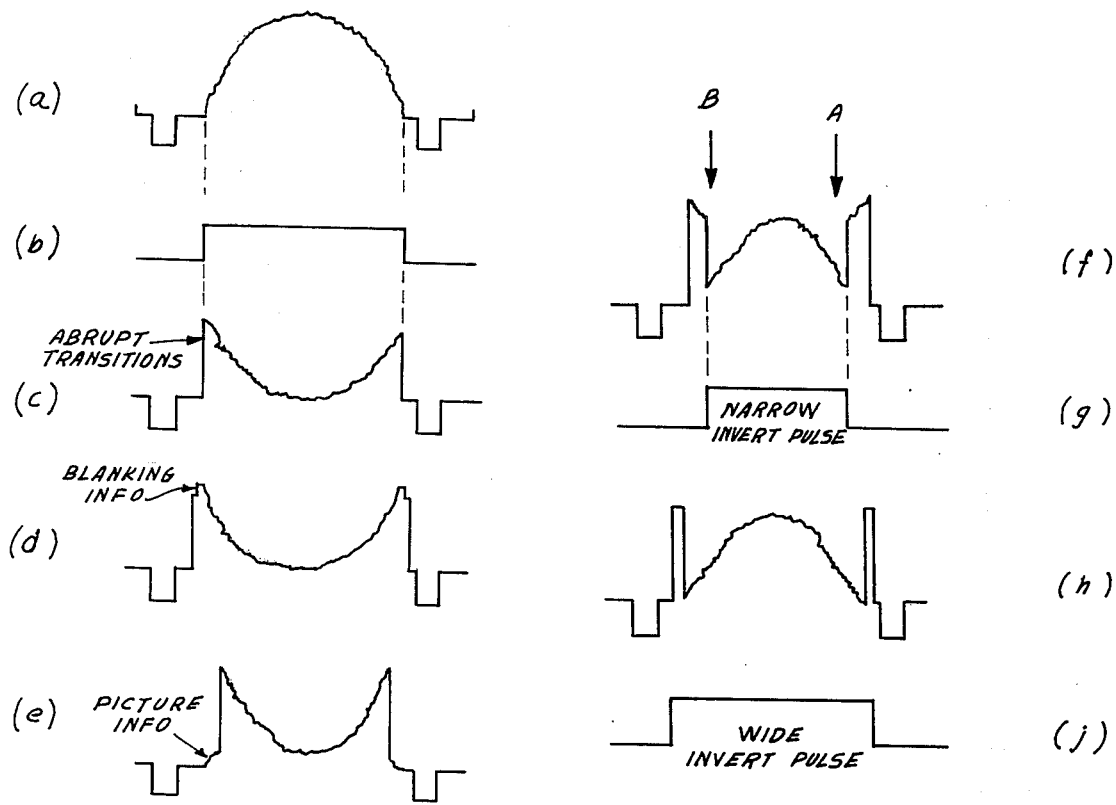
FIG. 1 is a wave form diagram illustrating the problems encountered with prior art subscription television systems.

A preferred embodiment of the present invention will now be described with reference to the drawing.

Figure 2:
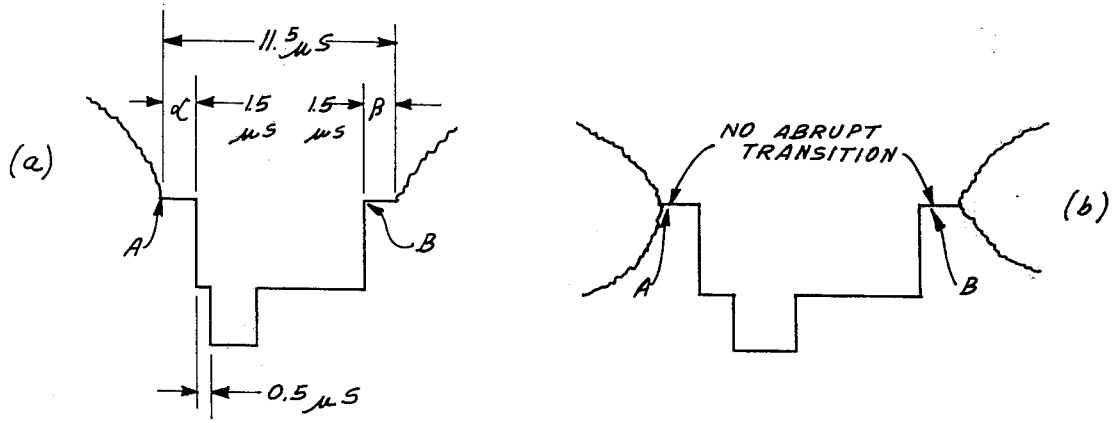
FIG. 2 is a wave diagram showing television signals including grey level clamped portions in accordance with the present invention.

The problems resulting from the switching of the video signal portion relative to the synchronizing signal portion of a television signal was discussed above with reference to FIG. 1. Referring now to FIG. 2, it is noted that the time instants at which switching takes place are denoted by A and B, respectively. A is thus an illustration of what is herein referred to as a second time instant while B is herein referred to as a "first time instant." The first time instants are those following which the television signal is to be inverted, while the second time instants are those following which the television signal is to be reinverted, that is returned to its original polarity. Reference to FIG. 2(a) shows that a one-and-a-half microsecond clamp signal is introduced, the start of which precedes the switching instants by a small amount. Since the desired switching instant, in a preferred embodiment of the present invention, is the beginning of the blanking interval it will be noted that the grey level clamp signal extends into the active signal portion by a small amount. Since the grey level clamping at the decoder, as will be explained in greater detail below, takes place immediately prior to the switching operation, the grey levels prior and after switching are sufficiently the same that residual spikes are now the result of limitations in circuitry alone. Spike amplitudes of ±1 IRE unit or less can readily be attained. It should further be noted that the grey level reference immediately prior to the picture signal interval (followng instant B in FIG. 2) is taken from the same channel as that picture information, that is from the inverted channel if the picture information is to be inverted or from the noninverted channel if no inversion is to take place. The grey level information is thus extracted from the same channel as the active video information immediately following it thereby serving as a reference level for clamping. Similarly, following the switching at point A in FIG. 2, the grey level reference is extracted from the noninverted channel, that is the channel from which the synchronizing signal information is always derived. Again, the grey level pulse can thus serve as a reference level for clamping.

Figure 3:
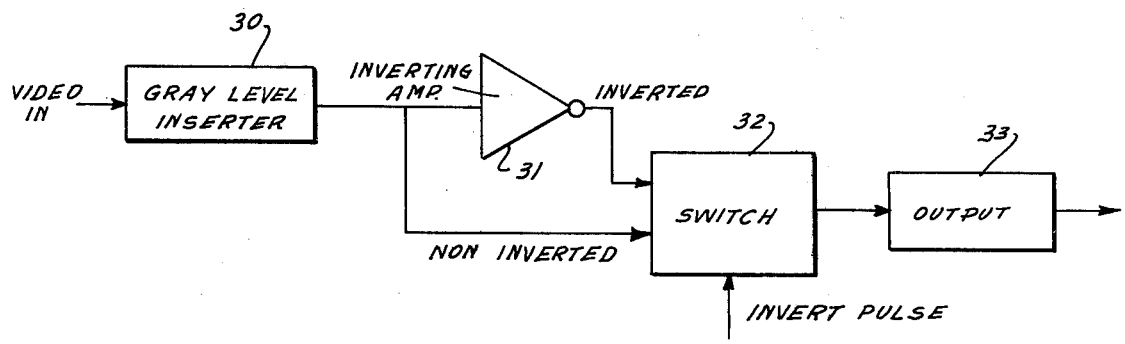
FIG. 3 is a block diagram of encoding circuitry including the grey level inserter of the present invention.

FIG. 3 shows the block diagram of a grey level inserter (clamping circuit) of the present invention as interconnected with the inverting amplifier of, for example, the Horowitz system of U.S. Pat. No. 3,824,332. The standard television signal is applied to the input of the grey level inserter 30 whose output is connected to the input of an inverting amplifier 31 and also directly to a switch 32. The output of inverting amplifier 31 is also connected to an input of switch 32. The output of switch 32 is connected to output circuitry 33. Switch 32 operates under the control of invert pulses. Specifically, the standard television signal is clamped to a grey level as illustrated in FIG. 2 and by circuitry which will be described with reference to FIG. 5. The output of the grey level inserter, which is the standard television signal but having the proper portions clamped at the grey level, is applied directly and in an inverted state to the input of switch 32 which, under control of the invert pulses, connects either the output of inverting amplifier 31 or the output of grey level inserter 30 directly to the output circuitry 33.

Figure 4:
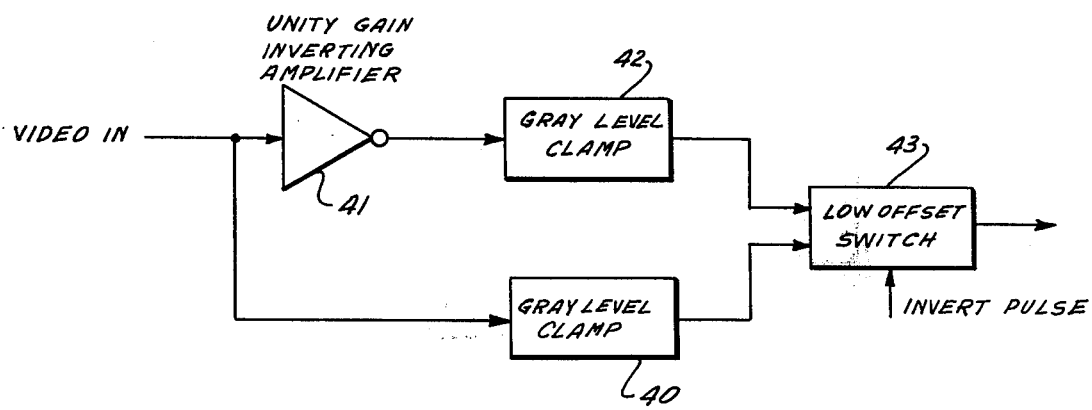
FIG. 4 is a decoder block diagram including the clamping circuit of the present invention.

Similarly, FIG. 4 shows the block diagram of the decoder circuitry. The encoded television signal is received. The signal, of course, has the grey level insertions generated at the encoder. The signal is applied to a grey level clamp 40 and, through an inverting amplifier 41, to a second grey level clamp 42. The outputs of grey level clamps 40 and 42 are applied to a low offset switch 43 which is substantially identical to switch 32 at the encoder. In the operation of the circuitry, the input to the low offset switch 43, which is either the inverted or the noninverted television signal including portions clamped to the desired grey level, is selectively switched to the output of switch 43 under the action of invert pulses. The latter cause an operation which is inverse to that of invert pulses at the encoder, thereby furnishing the standard television signal again at the output of switch 43. In should be noted that this signal is inherently correct and, because of the grey level clamps 40 and 42, requires no adjustment or set-up.

It should be noted specifically that if the inverting amplifier has a gain of unity ±2 percent and the combined offset of the clamp plus the switch is ±10mv, the flicker of the resultant picture is below the threshold of visibility. Both specifications are well within the capability of present technology without the use of adjusting potentiometers.

Figure 5:
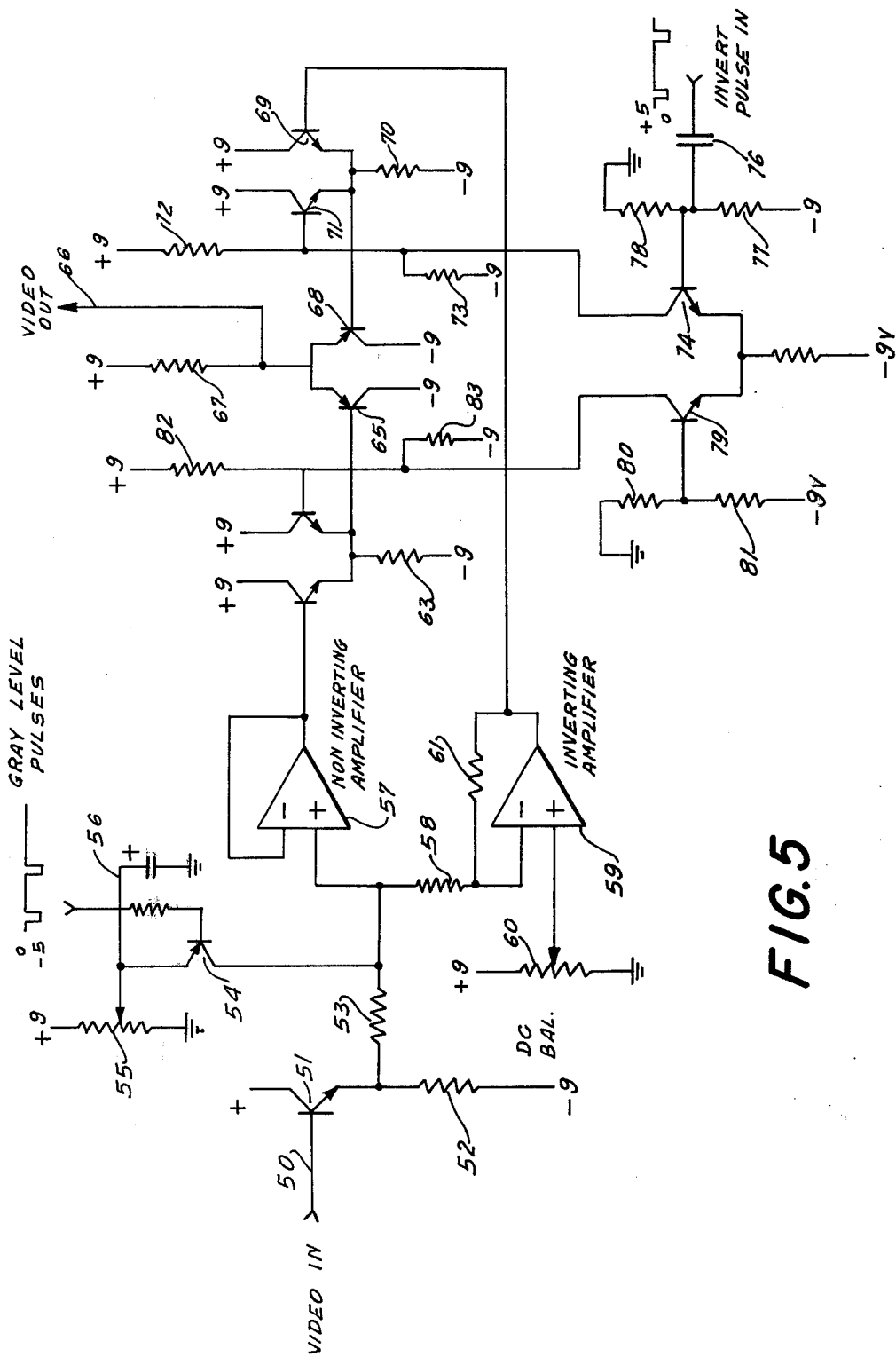
FIG. 5 is a circuit diagram showing the encoder clamping and switching circuits of the present invention.

The circuit diagram corresponding to the block diagram of FIG. 3 is shown in FIG. 5.

The composite television signal is received at terminal 50 and applied to the base of a transistor 51 having an emitter resistor 52. The emitter of transistor 51 is further coupled by a resistor 53 to the collector of a transistor 54 at whose base the grey level pulses are applied. The emitter of transistor 54 is connected to the wiper arm of a potentiometer 55 and is connected to ground potential through a capacitor 56. The terminal of resistor 53 coupled to the collector of transistor 54 is also coupled to the direct input of the noninverting amplifier 57 and by a resistor 58 to the inverting input of inverting amplifier 59. A fixed but adjustable potential is applied to the direct input of inverting amplifier 59 by means of a potentiometer 60. Inverting amplifier 59 further has a feedback resistor 61 coupled from the output of the inverting amplifier to its inverting input. The output of noninverting amplifier 57 is applied to the base of a transistor 62 having an emitter resistor 63. Connected in parallel with the emitter-collector circuit of transistor 62 is the emitter-collector circuit of a transistor 64. Transistors 62 and 64 are herein referred to, respectively, as first and second amplifier elements. The emitters of transistors 62 and 64 are connected to the base of a transistor 65 whose emitter is connected to the switching output terminal 66. A resistor 67 is connected from the emitter of transistor 65 to the positive supply source. Connected in parallel with the emitter-collector circuit of transistor 65 is the emitter-collector circuit of a transistor 68. Transistor 65 and 68 are herein referred to as the third and fourth amplifier elements, respectively. The output of inverting amplifier 59 is applied to the base of a transistor 69. Connected between the emitter of transistor 69 and the negative supply source is a resistor 70. Further, a transistor 71 has its emitter-collector circuit connected in parallel with the emitter-collector circuit of transistor 69. The emitters of transistors 69 and 71 are connected in common to the base of transistor 68. The base of transistor 71 is connected to the voltage divider tap of a voltage divider connected between the positive and negative supply source and comprising resistors 72 and 73. Further connected to the base of transistor 71 is the emitter-collector circuit of a transistor 74. The emitter of transistor 74 is connected through resistor 75 to the negative supply line. The invert pulses are applied to the base of transistor 74 through a capacitor 76. The base of transistor 74 is connected through a resistor 77 to the negative supply and through a resistor 78 to ground potential. Connected to the emitter of transistor 74 is the emitter of a transistor 79 whose base is connected to the voltage divider tap of a voltage divider having resistors 80 and 81. The collector of transistor 79 is connected to the tap of a voltage divider including a resistor 82 and a resistor 83. The voltage divider tap is also connected to the base of transistor 64.

The above described arrangement operates as follows:

The television signal is applied through buffer amplifier 51 and its associated circuitry to the inputs of both noninverting amplifier 57 and inverting amplifier 59. However, the grey level pulses applied to the base of transistor 54 are negative pulses which are designed to drive transistor 54 into full conduction thereby short-circuiting the television signal during the grey level pulse period. During the time of the grey level pulses, the grey level as determined by the setting of potentiometer 55 is thus applied to the direct input of noninverting amplifier 57 and the inverting input of inverting amplifier 59. The remaining circuitry in FIG. 5 constitutes a switch with low offset voltage. This switch, a preferred embodiment of the switching means, operates to selectively apply the output of either inverting amplifier 59 or noninverting amplifier 57 to the switching output 66 under control of the invert pulses applied to the base of transistor 64. Specifically, when the invert pulse is a low, transistor 74 blocks, transistor 79 is conductive and pulls the voltage at the base of transistor 64 below that of transistor 62. Further, since transistor 74 is not conducting, the base of transistor 71 is high causing this transistor to be in the conductive state while transistor 69 is blocked. Blocking of transistor 69 of course prevents the output of inverting amplifier 59 from being transmited to the base of transistor 68. At the same time the base of transistor 68 is more positive than that of transistor 65 causing transistor 68 to be blocked and transistor 65 to become conductive. Since transistor 65 is conductive, the signal from the output of noninverting amplifier 57 passes through conductive transistor 62 and is applied through its emitter resistor 63 to the base of conductive transistor 65. The output of the noninverting amplifier is therefore applied to switching output 66 in an amplified form.

Similarly, when the invert pulse is positive, transistor 74 is conductive while transistor 79 is blocked. Since transistor 74 is conductive, the voltage at the base of transistor 71 is pulled to a more negative value causing transistor 71 to block. Transistor 69 is thus conductive causing a voltage substantially equal to the output of inverting amplifier 59 to appear across resistor 70 and be applied to transistor 68. Since transistor 79 is blocked, the voltage at the base of transistor 64 is high causing this transistor to become conductive while transistor 62 is nonconductive thereby blocking the output of noninverting amplifier 57 from the base of transistor 65. Thus, when the invert pulse is positive, the output of inverting amplifier 59 is routed through transistor 69 and transistor 68 to the switching output terminal 66 while the output of the noninverting amplifier 57 is blocked from the switching output. The signal at switching output 66 is thus the encoded television signal which also has grey levels immediately prior to the switching interval and extending for a predetermined time period thereafter so that the signal at terminal 66 does not have the transients which would be generated without the insertion of the grey level pulses.

Figure 6:
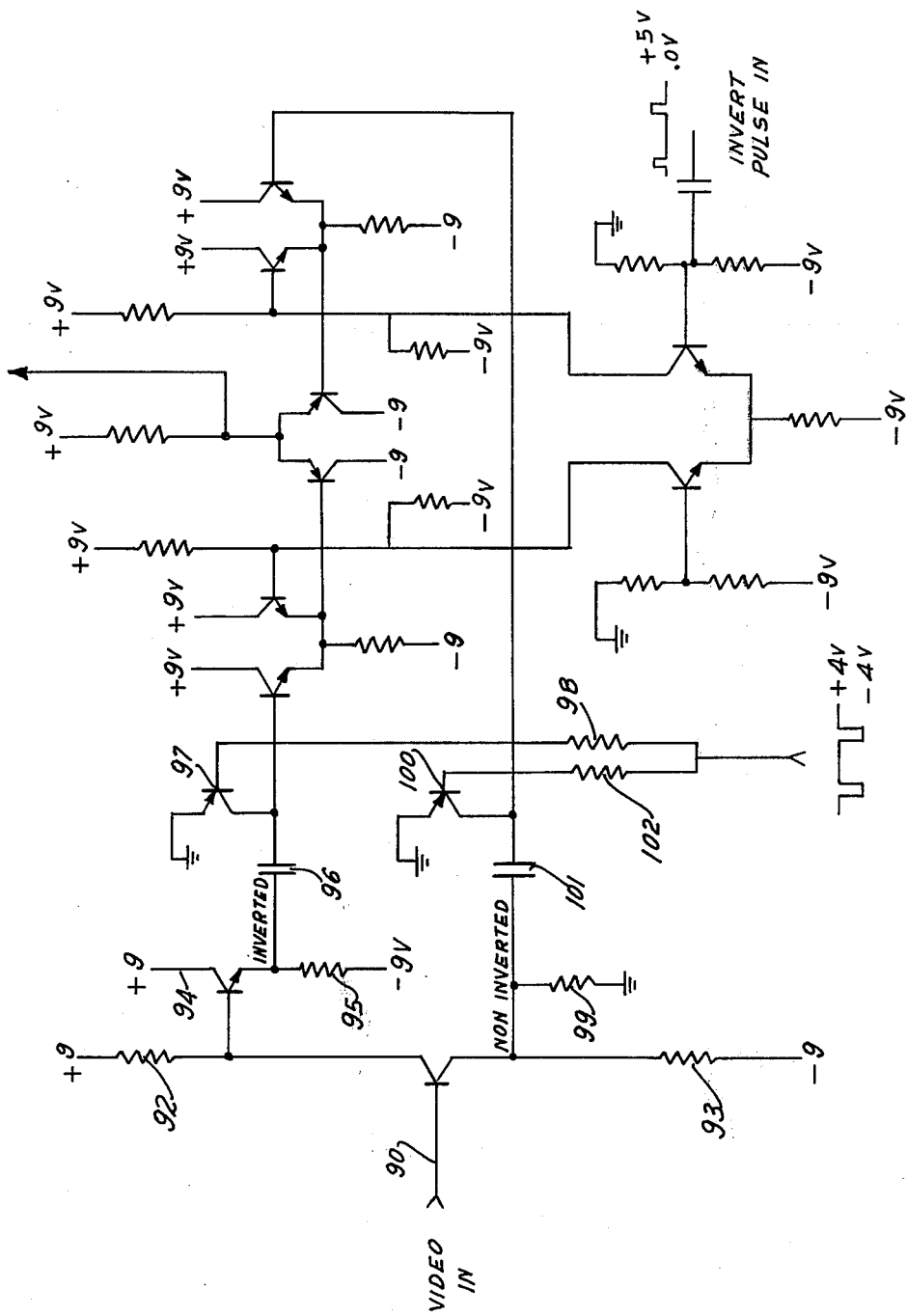
FIG. 6 is a decoder circuit diagram showing the clamping and switching circuit of the present invention.

The circuitry of the decoder is shown in FIG. 6. The signal received at terminal 90 is the encoded television signal with the grey level insertions. It is applied to the base of transistor 91 whose collector is connected through a resistor 92 to the positive supply source and whose emitter is connected through a resistor 93 to the negative supply source. The collector of transistor 91 is applied to the base of a transistor 94 whose emitter is connected through a resistor 95 to the negative supply source. It is further connected through a capacitor 96 to the collector of a transistor 97 whose emitter is connected to ground potential and whose base is connected to a resistor 98 whose other terminal receives the clamp pulses.

The emitter of transistor 91 is connected to ground potential through a resistor 99 and to the collector of a transistor 100 through a capacitor 101. The emitter of transistor 100 is grounded while its base is connected to a resistor 102 whose other terminal is connected to receive clamp pulses. The remainder of the circuitry in FIG. 6 is identical to the low offset switching circuit shown in FIG. 5 and, therefore, will not be described in detail here.

The above described circuit operates as follows:

The encoded television signal with the inserted grey level pulses is received at terminal 90. Since it is applied to the base of transistor 91, the signal at the collector of transistor 91 will be the inverted television signal while the signal at the emitter of transistor 91 will be the noninverted signal. At those times when the negative clamp pulses are applied to the bases of transistors 97 and 100, these transistors become fully conductive causing both the inverted and the noninverted signal to be clamped substantially at ground potential. The clamping pulses occur during the grey level pulse interval so that the grey levels in both cases are clamped very closely to ground potential. The low offset switch constituted by the remainder of the circuitry in FIG. 6 is the same as that shown in FIG. 5. The same components in each Figure have the same reference numbers, except that those in FIG. 6 are primed. The low offset switch causes either the inverted or the noninverted signal to appear at the switching output under control of the invert pulses. Both the inverted and the noninverted signal will have substantially the same grey level.

In order that the switch constitute a low offset switch, that is in order that the difference between the grey level in the two cases be small, the base emitter voltage of transistor 65 plus that of transistor 62 must be equal to or very close to those of the base emitter voltages of transistors 68 and 69. Further, the saturation voltages of transistors 97 and 100 should be equal.

Figure 7:
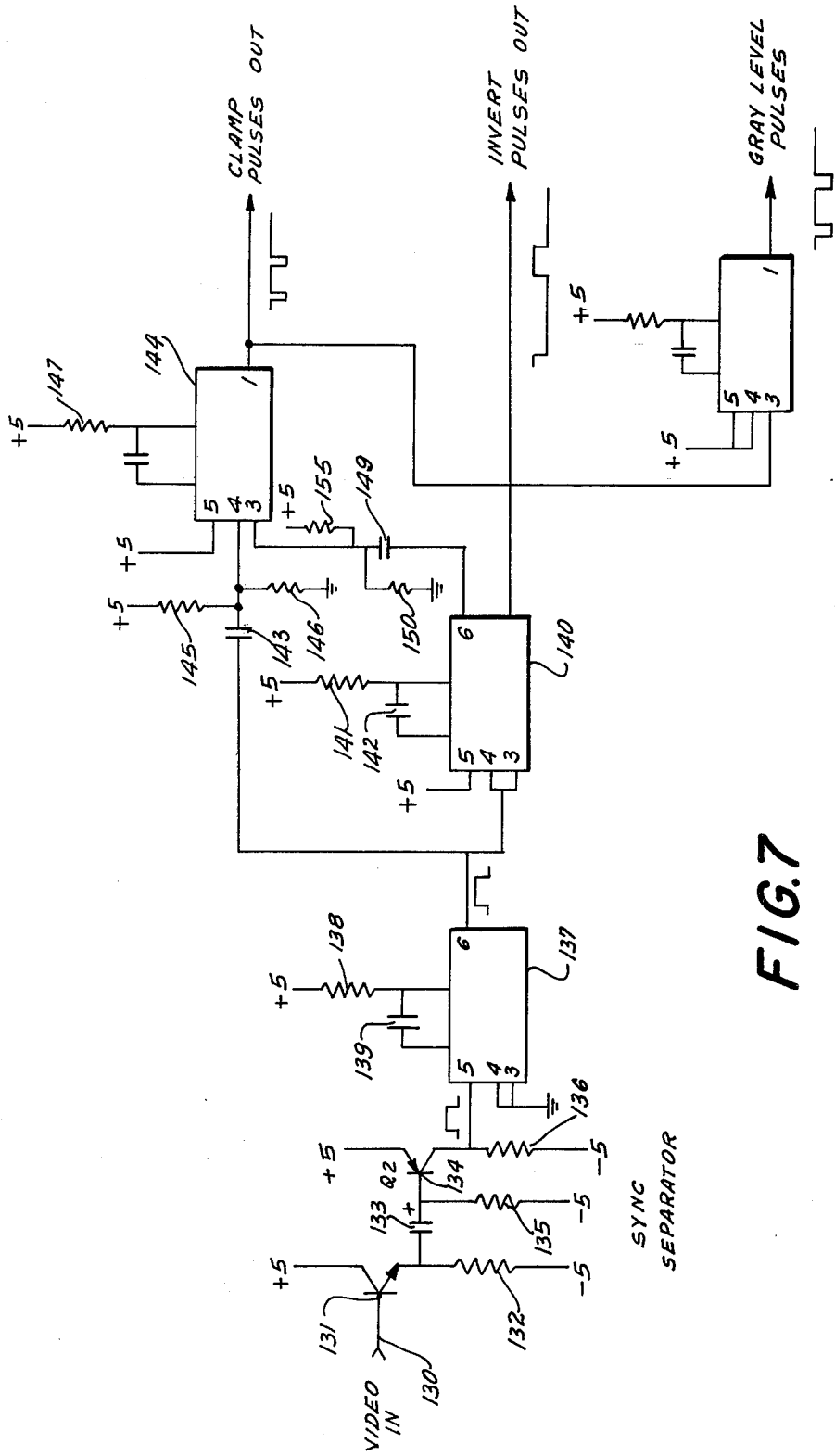
FIG. 7 is a circuit diagram illustrating the clamp pulse and invert pulse generators.

The circuit for deriving the clamp and inverted pulses required in FIG. 6 is shown in FIG. 7. The encoded signal received at terminal 130 is applied to the base of a transistor 131 whose collector is connected to the positive supply source while its emitter is connected through a resistor 132 to the negative supply source. The emitter of transistor 131 is further connected to a capacitor 133 whose other terminal is connected to the base of a transistor 134 and through a resistor 135 to the negative supply line. The emitter of transistor 134 is connected to the positive supply while its collector is connected through a resistor 136 to the negative supply. The emitter of transistor 134 is further connected to one input of a one shot multivibrator 137 whose timing circuit comprises a resistor 138 and a capacitor 139. The time constant of one shot multivibrator 137 is 9 microseconds. The output of one shot multivibrator 137 is connected to the input of a one shot multivibrator 140 whose time constant is determined by resistor 141 and a capacitor 142. The time constant of one shot multivibrator 140 is 53 microseconds. Its output constitutes the invert pulses. The output of one shot multivibrator 137 is further fed through a capacitor 143 to the input of a further monostable multivibrator 144. This input of the monostable multivibrator is further connected through a resistor 145 to the positive supply and through a resistor 146 to ground potential. The time constant of monostable multivibrator 144 is determined by a resistor 147 and a capacitor 148. In a preferred embodiment of the present invention it is one-half a microsecond. A further input of monostable multivibrator 144 is derived from the output of one shot multivibrator 140 through a capacitor 149. This input of monostable multivibrator 144 is further connected through a resistor 150 to ground potential and through a resistor 155 to the positive supply. The output of monostable multivibrator 144 constitutes the clamp pulses.

The above described arrangement operates as follows: The incoming television signal at terminal 130 is applied to the synchronizing signal separator 144. Capacitors 133, resistor 135 and the base-emitter junction of transistor 134 from a DC restorer circuit which clamps the video signal in such a manner that only the most negative portion of said signal causes transistor 134 to become conductive. Since the most negative portion of the television signal is the top of the synchronizing signal, transistor 134 conducts only during that time and behaves as a synchronizing signal separator. The positive going signals (synchronizing pulses) at the collector of transistor 134 are applied to monolithic one shot multivibrator 137 which triggers at the positive transition at its input. As mentioned above, the time constant of one shot multivibrator 137 is 9 microseconds. At the end of this period, namely on the negative going signal from one shot multivibrator 137, both one shot multivibrator 140 and monostable multivibrator 144 are triggered. A 53 microsecond pulse at the output of unit 140 constitutes the invert pulses. These will be applied to the low offset switches through an AND gate (not shown) whose other input is a control signal which, by logic circuitry which is not a part of the present invention, decides whether or not a particular video portion is or is not to be inverted. The generation of this control signal is disclosed in the above identified Horowitz patent. The clamp pulse generator 144 is triggered simultaneously with the invert pulse generator 140. The half microsecond pulses are sufficient for clamping purposes at the decoder since the grey level has been inserted at the encoder. It should further be noted that the beginning of the clamp pulse should slightly precede that of the invert pulse. This it taken care of by the fact that the circuitry through which the invert pulse becomes effective has slightly longer delay period than that of the clamp pulse. If necessary, of course, a short time constant delay circuit either at the input or the output of one shot multivibrator 140 may be provided.

It should also be noted that the monostable multivibrator 144 is also triggered at the end of the invert pulse by means of the circuitry comprising capacitor 149 and resistors 150 and 155. The second clamp pulse is thus delayed sufficiently so as to precede the following horizontal synchronizing pulse because of the long (53 microseconds) time constant of this one shot multivibrator. The clamp pulses thus occur during each of the grey level periods and occur substantially in the middle of these grey level periods.

At the encoder, the generation of the grey level pulses and the invert pulses can take place as the generation of the clamp pulses and the invert pulses at the decoder as described with reference to FIG. 7. The only difference would have to be that the monostable multivibrator 144 would have a time constant of one-and-a-half microseconds rather than of a half microsecond as shown in FIG. 7.

It is seen by the above descriptions of the Figures and operation of the present invention that the system and method proposed herein constitute a simple, reliable and effective means for eliminating switching transients and for balancing the DC levels of the signals derived from the inverted and the noninverted channels.

While the invention has been illustrated and described as embodied in a specific decoder and encoder circuitry, it is not intended to be limited to the details shown since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Subscription television apparatus comprising, in combination, means for inverting a television signal at first selected time instants in said television signal and reinverting said television signal at second time instants, each second time instant following a corresponding one of said first time instants; and clamping means connected to said inverting and reinverting means for clamping said television signal to a determined reference level during determined time intervals each including one of said time instants, whereby transients created during the inversion and reinversion of said television signal are prevented, wherein said means for inverting and reinverting said television signal comprise means for furnishing an inverted and a noninverted television signal, and switch means having a switching output and connected to said means for furnishing an inverted and a noninverted television signal, for selectively connecting said inverted or said noninverted television signal to said switching output under control of an invert signal, and means for furnishing said invert signal, wherein said means for furnishing an inverted and a noninverted television signal comprise means for furnishing a noninverted television signal and inverting amplifier means connected to said means for furnishing a noninverted television signal for inverting said noninverted television signal, thereby creating said inverted television signal; and wherein said clamping means comprise means for furnishing said reference level, transistor circuit means having an emitter-collector circuit connected between said means for furnishing said reference level and said means for furnishing a noninverted television signal and further having a base, for connecting said means for furnishing a noninverted television signal to said means for furnishing said reference level in response to grey level pulses applied to said base, and means for applying said grey level pulses to said base during each of said determined time intervals, wherein said television signal has horizontal line intervals including a blanking interval and a video signal interval; wherein each of said first selected time instants substantially coincide with the start of said video signal intervals and each of said second time instants substantially coincides with the end of said video signal intervals.

2. Apparatus as set forth in claim 1, wherein said means for applying grey level pulses comprise synchronizing signal separator means for receiving said television signal and separating horizontal synchronizing pulses therefrom, delay means connected to said synchronizing signal, separator means for delaying said horizontal synchronizing pulses by a predetermined delay interval thereby furnishing a delayed synchronizing pulse having a leading and a trailing edge and grey level pulse generator means connected to said delay means for furnishing a grey level pulse having said pulse width equal to said predetermined time interval in response to a determined one of said leading or said trailing edge.

3. Apparatus as set forth in claim 2, wherein said delay means comprise a one shot multivibrator.

4. Apparatus as set forth in claim 2, wherein said grey level pulse generating means comprise a one shot multivibrator.

5. Subscription television apparatus comprising, in combination, means for inverting a television signal at first selected time instants in said television signal and reinverting said television signal at second time instants, each second time instant following a corresponding one of said first time instants; and clamping means connected to said inverting and reinverting means for clamping said television signal to a determined reference level during determined time intervals each including one of said time instants, whereby transients created during the inversion and reinversion of said television signal are prevented, wherein said means for inverting and reinverting said television signal comprise means for furnishing an inverted and a noninverted television signal, and switch means having a switching output and connected to said means for furnishing an inverted and a noninverted television signal, for selectively connecting said inverted or said noninverted television signal to said switching output under control of an invert signal, and means for furnishing said invert signal, wherein said switching means comprise a first amplifier element having a control electrode connected to receive said noninverted television signal and a main conducting circuit, a second amplifier element having a main conducting circuit connected in parallel with said main conducting circuit of said first amplifier element and having a control electrode, a third amplifier element having a control electrode connected to said main conducting circuit of said first amplifier element for receiving said noninverted amplifier signal and a main conducting circuit connected to said switching output for transferring said noninverted television signal to said switching output when conductive and for blocking said noninverted amplifier signal from said switching output when blocked, a fourth amplifier element having a main conducting circuit connected in parallel with said main conducting circuit of said third amplifier element and a control electrode, a fifth amplifier element having a control electrode connected to receive said inverted television signal and having a main conducting circuit, a sixth amplifier element having a main conducting circuit connected in parallel with said main conducting circuit of said fifth amplifier element and having a control electrode, means for connecting said main conducting paths of said fifth and sixth amplifier elements to said control electrode of said fourth amplifier element in such a manner that said fourth amplifier element furnishes said inverted television signal to said switching output when said third amplifier element is conductive and blocks said inverted television signal from said switching output when said fourth amplifier element is conductive, and means for applying said invert signal to said control electrode of said second and sixth amplifier elements in such a manner that said second amplifier element is conductive thereby blocking said noninverted television signal from said switching output in the presence of said invert signal and that said sixth amplifier element is conductive thereby blocking said inverted television signal from said switching output in the absence of said invert signal.

6. Apparatus as set forth in claim 5, wherein said invert signal is an invert pulse; and wherein said means for applying said invert signal to said control electrodes of said second and sixth amplifier means comprise a bistable circuit having a first bistable output connected to said control electrode of said second amplifier element, a second bistable output connected to said control electrode of said sixth amplifier element and a control input for receiving said invert pulses, for furnishing a bistable output signal blocking said second amplifier element at said first bistable output in the absence of said invert pulse for furnishing a bistable output signal at said second bistable output for blocking said sixth amplifier element in response to said invert pulse.

7. In a method for encoding a television signal, said method including the step of switching said television signal from a normal value to a corresponding encoded value at first selected time instants in said television signal and switching said television signal back to said normal value at second time instants each following one of said first time instants, the improvement comprising the step of clamping said television signal to a predetermined reference level during predetermined time intervals, each including one of said time instants, whereby the generation of transients as a result of said switching and switching back is prevented.

8. A method as set forth in claim 7, wherein said step of switching and switching back said television signal comprises inverting and reinverting said television signal.

9. A method as set forth in claim 8, wherein said television signal has horizontal line intervals each including a blanking portion and a video signal portion; and wherein said first and second selected time instants occur, respectively, at the start and end of selected ones of said video signal portions.

10. A method as set forth in claim 9, wherein said step of inverting and reinverting said television signal comprises furnishing a noninverted television signal, furnishing an inverted television signal, and selectively switching said inverted or said noninverted television signal to a predetermined output terminal under control of an invert signal.

11. A method as set forth in claim 10, whererin said step of clamping said television signal comprises clamping said noninverted television signal and wherein said step of furnishing said inverted television signal comprises the step of inverting said television signal subsequent to said clamping of said television signal.

12. Subscription television apparatus, comprising, in combination, means for switching a television signal from a normal to an encoded value at first selected time instants in said television signal and switching said television signal back to said normal value at second time instants each following a corresponding one of said first time instants, whereby undesired transients are created; and clamping means connected to said means for switching and switching back said television signal, for clamping said television signal to a predetermined reference level during predetermined time intervals each including one of said time instants, whereby the creation of said undesired transients is prevented.

13. Apparatus as set forth in claim 12, wherein said means for switching said television signal from said normal to said encoded value and for switching said television signal back to said normal value comprise means for, respectively, inverting and reinverting said television signal.

14. Apparatus as set forth in claim 13, wherein said means for inverting and reinverting said television signal comprise means for furnishing an inverted and a noninverted television signal, and switch means having a switching output and connected to said means for furnishing an inverted and a noninverted television signal, for selectively connecting said inverted or said noninverted television signal to said switching output under control of an invert signal, and means for furnishing said invert signal.

15. Apparatus as set forth in claim 14, wherein said means for furnishing an inverted and a noninverted television signal comprise means for furnishing a noninverted television signal and inverting amplifier means connected to said means for furnishing a noninverted television signal for inverting said noninverted television signal, thereby creating said inverted television signal; and wherein said clamping means comprise means for furnishing said reference level, transistor circuit means having an emitter-collector circuit connected between said means for furnishing said reference level and said means for furnishing a noninverted television signal and further having a base, for connecting said means for furnishing a noninverted television signal to said means for furnishing said reference level in response to grey level pulses applied to said base, and means for applying said grey level pulses to said base during each of said determined time intervals.

16. Apparatus as set forth in claim 15, wherein said grey level pulses have a pulse width substantially equal to one of said determined time intervals.

* * * * *